(12) United States Patent
Wakiyama et al.

(10) Patent No.: US 12,535,977 B2
(45) Date of Patent: Jan. 27, 2026

(54) IMAGE FORMING APPARATUS, IMAGE FORMING METHOD, AND NON-TRANSITORY COMPUTER READABLE MEDIUM STORING PROGRAM FOR PRESENTING INFORMATION BEFORE SCHEDULE TIME FRAME

(71) Applicant: FUJIFILM BUSINESS INNOVATION CORP., Tokyo (JP)

(72) Inventors: Tetsuya Wakiyama, Kanagawa (JP); Hiroshi Niina, Kanagawa (JP); Kiyotaka Tsuchibuchi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 678 days.

(21) Appl. No.: 17/863,790

(22) Filed: Jul. 13, 2022

(65) Prior Publication Data

US 2023/0297306 A1    Sep. 21, 2023

(30) Foreign Application Priority Data

Mar. 16, 2022 (JP) .................................. 2022-041613

(51) Int. Cl.
*G06F 3/12* (2006.01)

(52) U.S. Cl.
CPC ............ *G06F 3/126* (2013.01); *G06F 3/1205* (2013.01); *G06F 3/1286* (2013.01)

(58) Field of Classification Search
None
See application file for complete search history.

(56) References Cited

U.S. PATENT DOCUMENTS

2021/0160396 A1*  5/2021  Kubota ............. H04N 1/00411

FOREIGN PATENT DOCUMENTS

JP    2005-190017 A    7/2005
JP    2016-049758 A    4/2016

* cited by examiner

*Primary Examiner* — Andrew H Lam
(74) *Attorney, Agent, or Firm* — Oliff PLC

(57) ABSTRACT

An image forming apparatus includes a processor configured to: set a schedule for the image forming apparatus by receiving a schedule time frame; and present a function available before the schedule time frame and a processing amount of the available function in response to a preset operation received before the schedule time frame.

19 Claims, 16 Drawing Sheets

FIG. 12
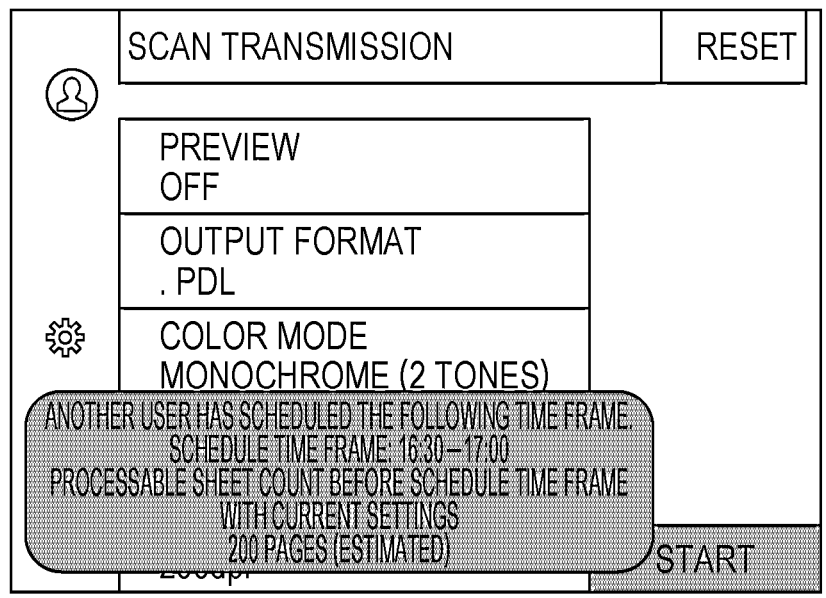
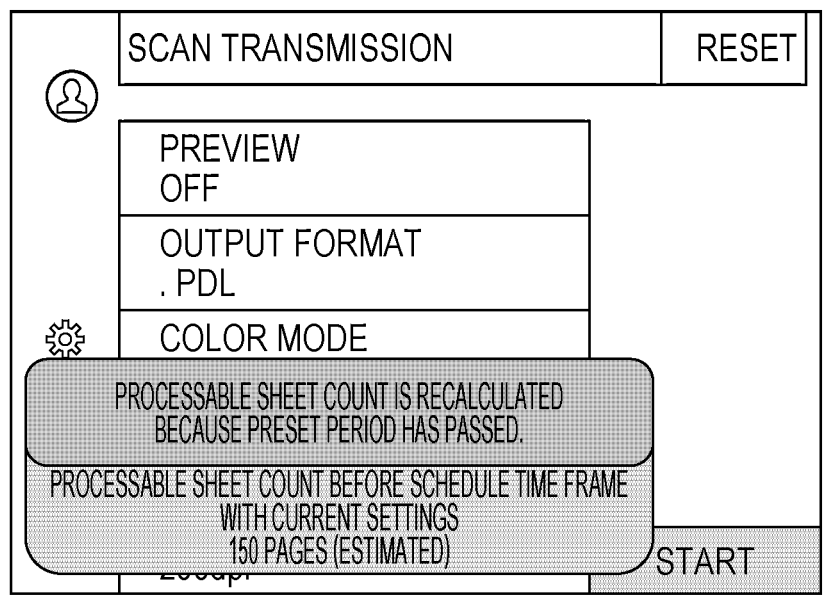

IMAGE FORMING APPARATUS, IMAGE FORMING METHOD, AND NON-TRANSITORY COMPUTER READABLE MEDIUM STORING PROGRAM FOR PRESENTING INFORMATION BEFORE SCHEDULE TIME FRAME

CROSS-REFERENCE TO RELATED APPLICATIONS

This application is based on and claims priority under 35 USC 119 from Japanese Patent Application No. 2022-041613 filed Mar. 16, 2022.

BACKGROUND

(i) Technical Field

The present disclosure relates to an image forming apparatus, an image forming method, and a non-transitory computer readable medium storing a program.

(ii) Related Art

Japanese Unexamined Patent Application Publication No. 2016-049758 proposes an image forming apparatus including a receiver that receives scheduling of a print job whose processing completion time is specified, a scheduler that determines a print job execution schedule showing a scheduled print job processing period and an expected processing start time, an estimator that, in response to input of an interrupt job, determines an interrupt job processing period, and a determiner that determines whether to execute the interrupt job based on the print job execution schedule and the interrupt job processing period.

Japanese Unexamined Patent Application Publication No. 2005-190017 proposes a printing control apparatus including a printing completion time specifier that specifies a desired printing completion time of a print job, an expected printing period estimator that estimates an expected printing period to complete the print job, and a printing sequence changer that, if a print job queue includes a plurality of print jobs whose printing completion times are specified and not specified, changes the printing sequence based on the printing completion times and the expected printing periods so that the print jobs whose printing completion times are specified in the print job queue may be completed before the respective printing completion times.

SUMMARY

Aspects of non-limiting embodiments of the present disclosure relate to the following circumstances. If a user has set a schedule time frame to use an image forming apparatus and a user other than the scheduled job user uses the image forming apparatus before the schedule time frame, the other user is not informed about a function available before the schedule time frame and its processing amount.

Aspects of non-limiting embodiments of the present disclosure therefore relate to an image forming apparatus, an image forming method, and a non-transitory computer readable medium storing an image forming program in which the function available before the schedule time frame and its processing amount are presentable.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus comprising a processor configured to: set a schedule for the image forming apparatus by receiving a schedule time frame; and present a function available before the schedule time frame and a processing amount of the available function in response to a preset operation received before the schedule time frame.

BRIEF DESCRIPTION OF THE DRAWINGS

An exemplary embodiment of the present disclosure will be described in detail based on the following figures, wherein:

FIG. 12 illustrates an example in which a notification about recalculation of the estimated sheet count is displayed and the recalculated estimated sheet count is displayed after an elapse of one minute;

DETAILED DESCRIPTION

Figure 1:
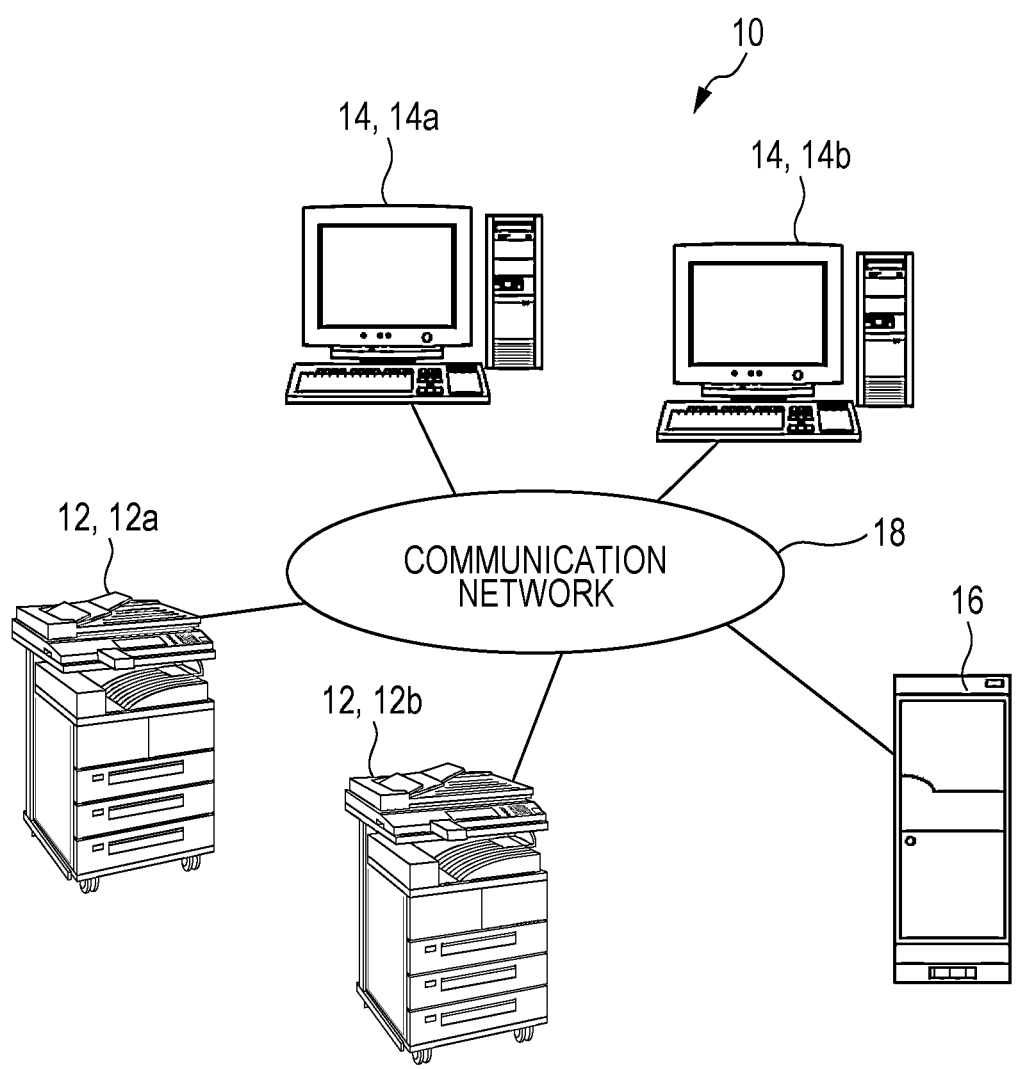
FIG. 1 illustrates an overall configuration of an information processing system including image forming apparatuses according to an exemplary embodiment.

An exemplary embodiment is described in detail with reference to the drawings. FIG. 1 illustrates an overall configuration of an information processing system 10 including image forming apparatuses according to this exemplary embodiment.

As illustrated in FIG. 1, the information processing system 10 includes a plurality of image forming apparatuses 12a, 12b, . . . , a plurality of information processing terminals 14a, 14b, . . . , and a cloud server 16. If there is no need to distinguish the image forming apparatuses 12a, 12b, . . . or the information processing terminals 14a, 14b . . . , alphabets suffixed to the reference numerals may be omitted. Although this exemplary embodiment is applied to the example including the plurality of image forming apparatuses 12a, 12b, . . . and the plurality of information processing terminals 14a, 14b, . . . , this exemplary embodiment is also applicable to a case of a single image forming apparatus 12 and a single information processing terminal 14, or a case of a single image forming apparatus 12 or a single information processing terminal 14. Although the single cloud server 16 is provided, a plurality of servers may be provided. Although this exemplary embodiment is applied to the example including the cloud server 16, the cloud server 16 may be omitted.

The image forming apparatuses 12, the information processing terminals 14, and the cloud server 16 are connected via a communication network 18 such as a local area network (LAN), a wide area network (WAN), the Internet, or an intranet. The image forming apparatuses 12, the information processing terminals 14, and the cloud server 16 may transmit and receive various types of data via the communication network 18.

Examples of the image forming apparatus 12 include an image forming apparatus having a plurality of functions such as a facsimile function, an image reading function, an image forming function, a copying function, an image information storage function, and an image information transmission function. The image reading function, the image forming function, the copying function, and the transmission function may hereinafter be referred to as "scan", "print", "copy", and "fax", respectively.

Figure 2:
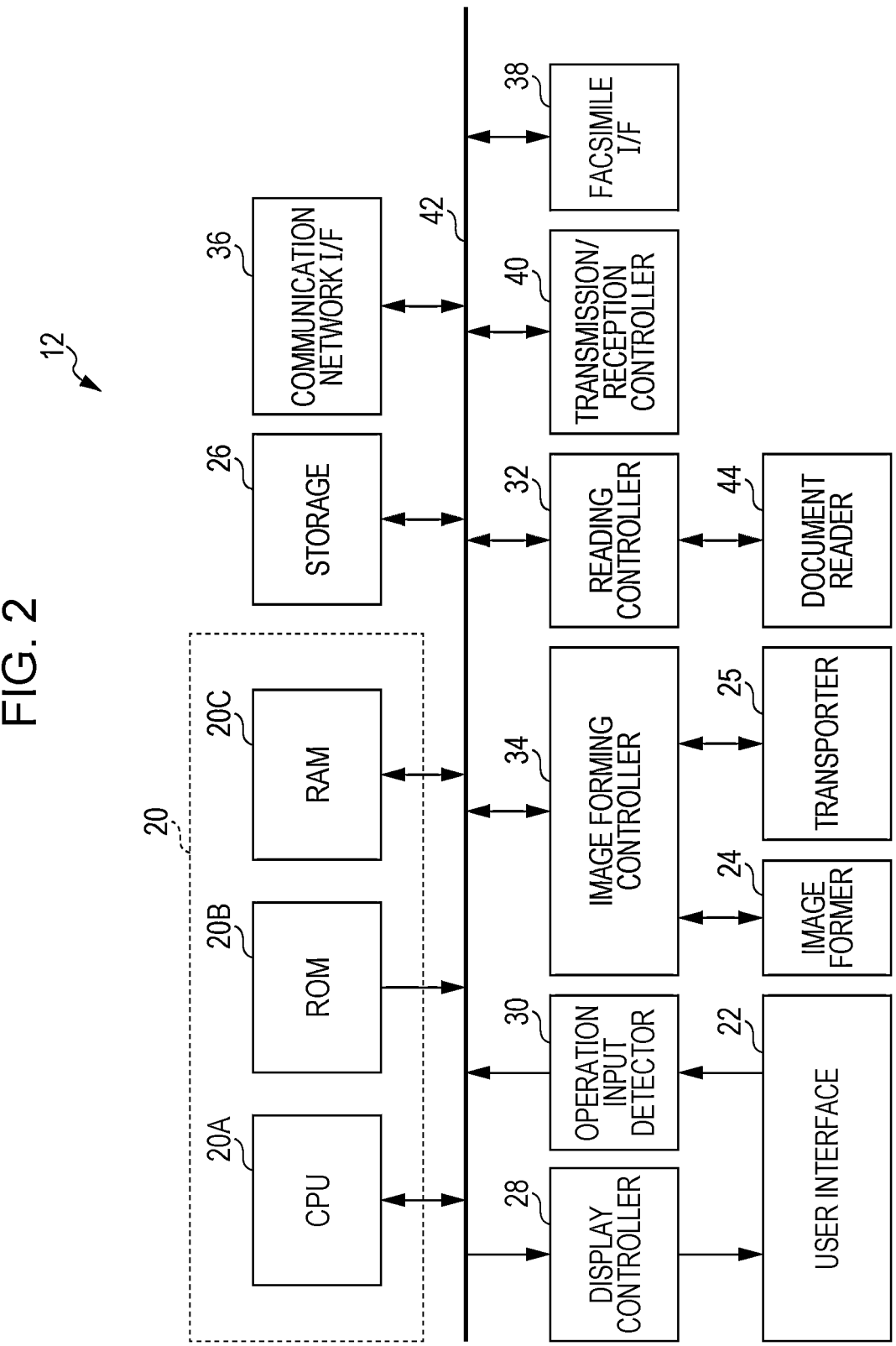
FIG. 2 is a block diagram illustrating an electrical configuration of the image forming apparatus according to the exemplary embodiment.

FIG. 2 is a block diagram illustrating an electrical configuration of the image forming apparatus 12 according to this exemplary embodiment.

As illustrated in FIG. 2, the image forming apparatus 12 according to this exemplary embodiment includes a control unit 20 including a central processing unit (CPU) 20A, a read only memory (ROM) 20B, and a random access memory (RAM) 20C. The CPU 20A controls the overall operation of the image forming apparatus 12. The RAM 20C is used as a working area during execution of various programs by the CPU 20A. The ROM 20B prestores various control programs and various parameters. In the image forming apparatus 12, the individual parts of the control unit 20 are electrically connected by a system bus 42.

The image forming apparatus 12 according to this exemplary embodiment includes a storage 26 such as a hard disk drive (HDD) that stores various types of data and application programs. The image forming apparatus 12 includes a display controller 28 that is connected to a user interface 22 and controls display of various operation screens on a display of the user interface 22. The image forming apparatus 12 includes an operation input detector 30 that is connected to the user interface 22 and detects operation instructions input via the user interface 22. In the image forming apparatus 12, the storage 26, the display controller 28, and the operation input detector 30 are electrically connected to the system bus 42. Although the storage 26 is applied as a memory in the image forming apparatus 12 according to this exemplary embodiment, a non-volatile memory such as a flash memory may be applied.

The image forming apparatus 12 according to this exemplary embodiment includes a reading controller 32 that controls an optical image reading operation of a document reader 44 and a document feeding operation of a document transporter, and an image forming controller 34 that controls an image forming process of an image former 24 and paper transport to the image former 24 by a transporter 25. The image forming apparatus 12 includes a communication network interface (I/F) 36 that is connected to the communication network 18 and transmits and receives communication data to and from external devices such as the cloud server 16 connected to the communication network 18. The image forming apparatus 12 includes a facsimile interface (I/F) 38 that is connected to a telephone line (not illustrated) and transmits and receives facsimile data to and from a facsimile machine connected to the telephone line. The image forming apparatus 12 includes a transmission/reception controller 40 that controls transmission and reception of facsimile data via the facsimile I/F 38. In the image forming apparatus 12, the transmission/reception controller 40, the reading controller 32, the image forming controller 34, the communication network I/F 36, and the facsimile I/F 38 are electrically connected to the system bus 42.

With the configuration described above, the CPU 20A of the image forming apparatus 12 according to this exemplary embodiment accesses the RAM 20C, the ROM 20B, and the storage 26. The CPU 20A of the image forming apparatus 12 causes the display controller 28 to control display of operation screens and various types of information such as messages on the display of the user interface 22. The CPU 20A of the image forming apparatus 12 causes the reading controller 32 to control operations of the document reader 44 and the document transporter. The CPU 20A of the image forming apparatus 12 causes the image forming controller 34 to control operations of the image former 24 and the transporter 25, and controls the transmission and reception of communication data via the communication network I/F 36. The CPU 20A of the image forming apparatus 12 causes the transmission/reception controller 40 to control the transmission and reception of facsimile data via the facsimile I/F 38. The CPU 20A of the image forming apparatus 12 grasps details of operation on the user interface 22 based on operation information detected by the operation input detector 30, and executes various types of control based on the details of operation.

Figure 3:
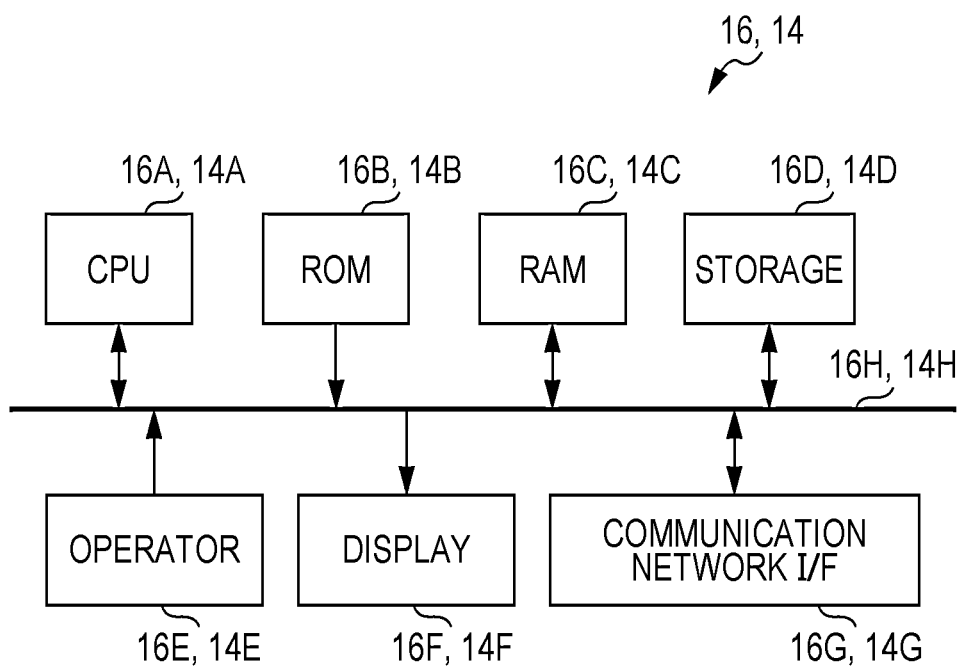
FIG. 3 is a block diagram illustrating an electrical configuration of each of an information processing terminal and a cloud server according to the exemplary embodiment.

Description is made about an electrical configuration of each of the information processing terminal 14 and the cloud server 16 according to this exemplary embodiment. FIG. 3 is a block diagram illustrating the electrical configuration of each of the information processing terminal 14 and the cloud server 16 according to this exemplary embodiment. The information processing terminal 14 and the cloud server 16 basically have configurations of general computers, and therefore the cloud server 16 is described as a representative.

As illustrated in FIG. 3, the cloud server 16 according to this exemplary embodiment includes a CPU 16A, a ROM 16B, a RAM 16C, a storage 16D, an operator 16E, a display 16F, and a communication network interface (I/F) 16G. The CPU 16A controls the overall operation of the cloud server 16. The ROM 16B prestores various control programs and various parameters. The RAM 16C is used as a working area during execution of various programs by the CPU 16A. The storage 16D stores various types of data and application programs. Examples of the operator 16E include a keyboard and a mouse to be used for inputting various types of information. The display 16F is used for displaying various types of information. The communication network I/F 16G is connected to the communication network 18 and transmits and receives various types of data to and from other devices connected to the communication network 18. The individual parts of the cloud server 16 are electrically connected by a system bus 16H. Although the storage 16D is applied as a memory in the cloud server 16 according to this exemplary embodiment, another non-volatile memory such as a flash memory may be applied.

With the configuration described above, the CPU 16A of the cloud server 16 according to this exemplary embodiment accesses the ROM 16B, the RAM 16C, and the storage 16D, acquires various types of data via the operator 16E, and causes the display 16F to display various types of information. The CPU 16A of the cloud server 16 controls the transmission and reception of communication data via the communication network I/F 16G.

Figure 4:
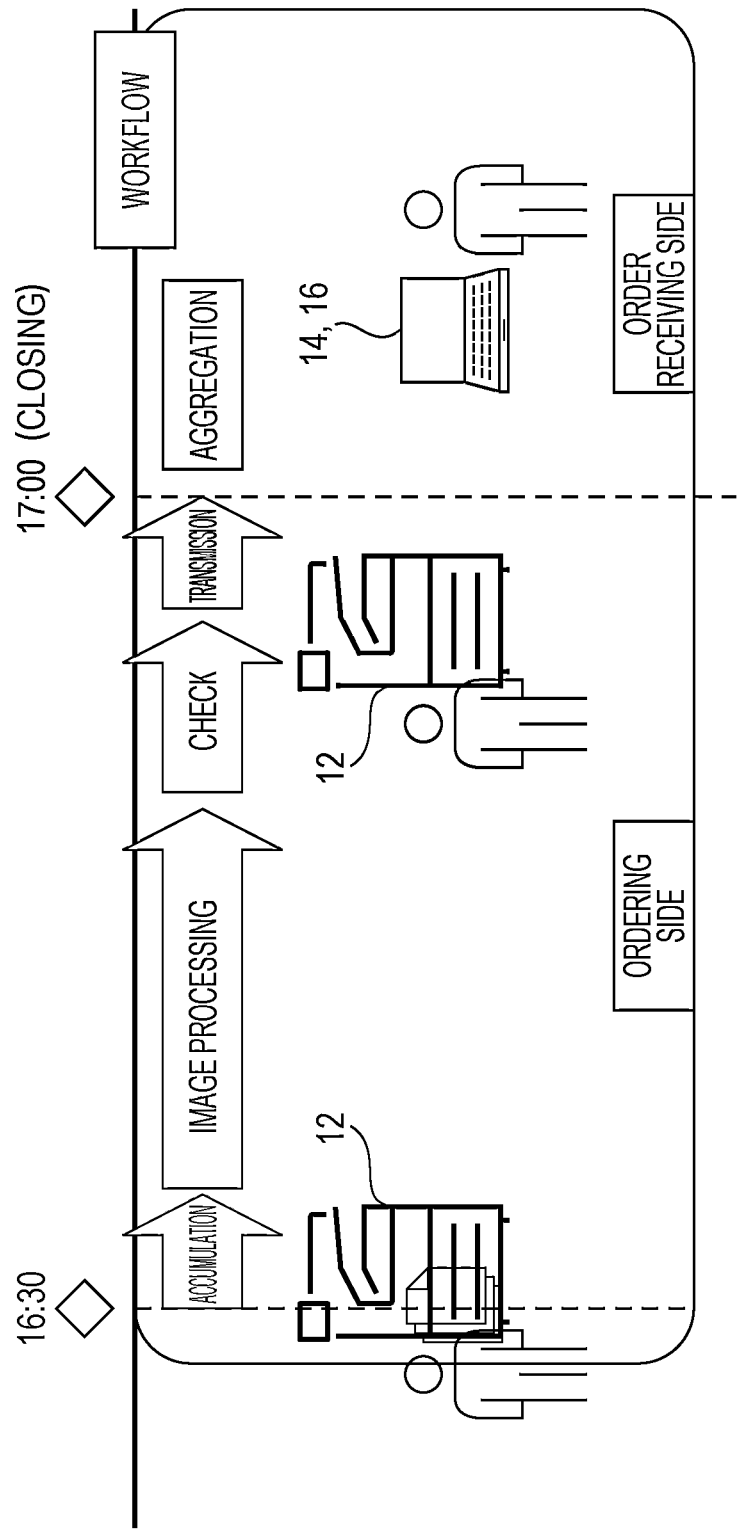
FIG. 4 illustrates an example of a workflow.

The image forming apparatus 12 according to this exemplary embodiment having the configuration described above may execute a workflow in response to input of reading data obtained by the image reading function of the image forming apparatus 12. An example of the workflow is illustrated in FIG. 4. Target forms are read at a predetermined timing such as the end of daily business or the end of every month by using the reading function of the image forming apparatus 12 installed in an ordering company. The reading data is transmitted to the information processing terminal 14 or the cloud server 16 on an order receiving side to request aggregation. The workflow is a procedure of predetermined processes on business. For example, the workflow includes a plurality of steps and defines a flow of business routine to be conducted by staff members in the individual steps.

Some workflows may be expected to complete processes before a predetermined timing. For example, in an ordering process involving transmission of daily reports or monthly application forms, planned digitization of past paper documents, or transmission of wholesale or retail ordering forms (e.g., ordering forms for packed lunch or other food-related business), it is expected that forms or other documents be read and aggregation be requested before a preset time.

The workflow includes user's check at the end of the reading process by the image reading function. For example, at the end of a job, optical character reader (OCR) results may be displayed on the user interface 22 of the image forming apparatus 12 for check and correction. In this case, the workflow on the ordering side in FIG. 4 includes, for example, a process of reading images of forms and accumulating reading results in the storage 26, OCR image processing for the accumulated data, a process of checking OCR results on a screen, and a process of transmitting the checked data. The workflow on the order receiving side includes a process of aggregating the transmitted data.

The job is a process or a set of processes to be executed by the image forming apparatus 12 to implement a predetermined function.

The image forming apparatus 12 according to this exemplary embodiment has a prioritized schedule setting function for setting a prioritized schedule time frame for a scheduled job user who wants to occupy a preset time frame to execute the processes before a predetermined time as in the workflow described above. In the prioritized schedule setting, a prioritized schedule start time, a prioritized schedule end time, and a function to be used are set. The function to be used may be selected from among scanning, printing, copying, and facsimile, and a plurality of functions may be selected.

Figure 5:
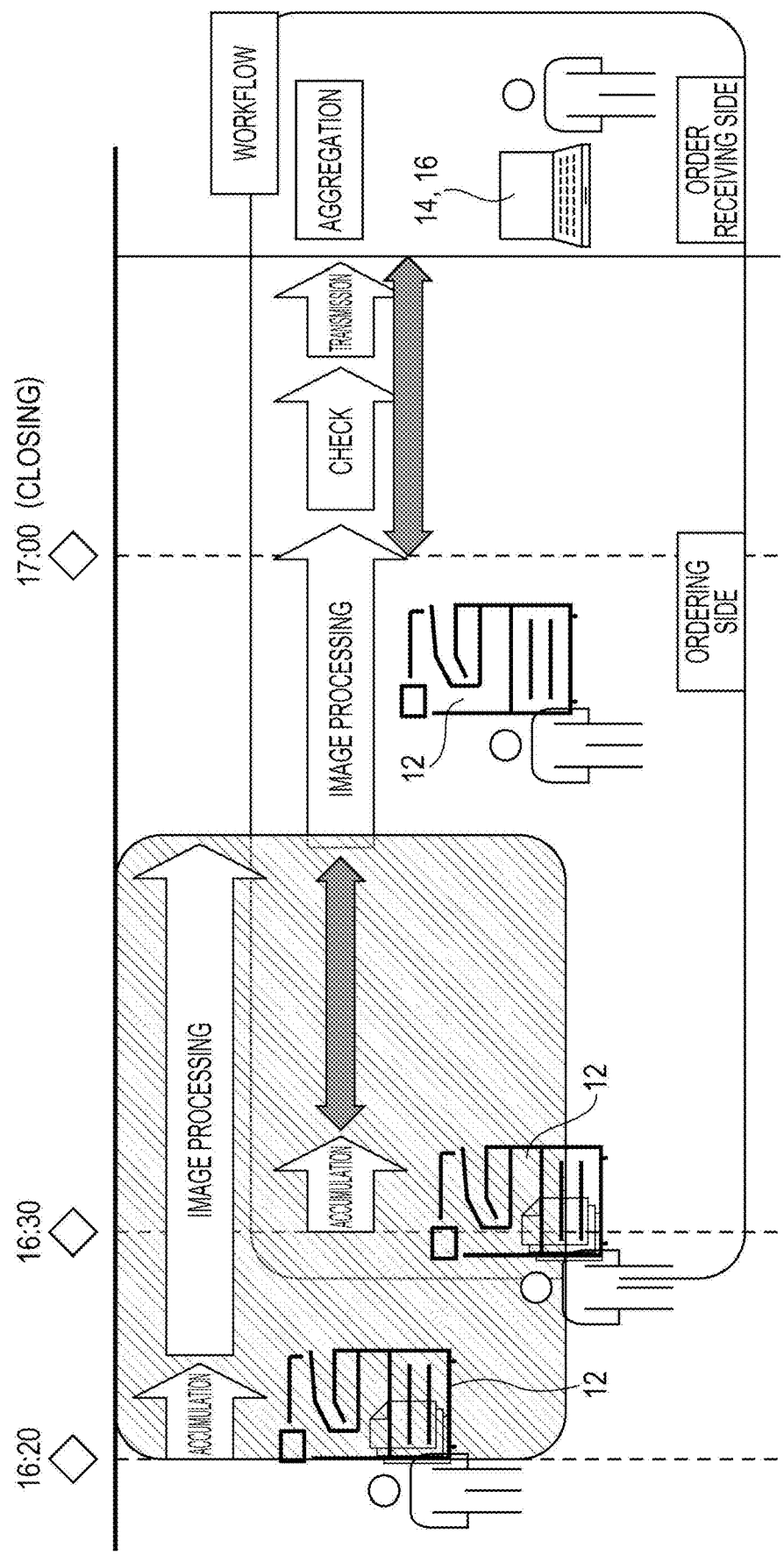
FIG. 5 illustrates an example of delay in processing for a scheduled job user due to the use of the image forming apparatus by another user.

In a case where the prioritized schedule time frame has been set and a user other than the scheduled job user uses the image forming apparatus before the schedule time frame, the other user is not informed about a function available before the schedule time frame and its processing amount. If the other user reads a large number of documents by using the scanning function before the schedule start time, the processes may remain incomplete at the schedule start time. For example, as illustrated in FIG. 5, a schedule of 16:30 to 17:00 has been set but the other user may use the image forming apparatus from 16:20 and the processes may remain incomplete at 16:30. In this case, the processes of the scheduled job user start with a delay and the data is not transmitted to the order receiving side before 17:00. On the order receiving side, the data is not received at the expected time and therefore the aggregation may be delayed.

In the image forming apparatus 12 according to this exemplary embodiment, a schedule for the image forming apparatus 12 is set by receiving a schedule time frame, and a function available before the schedule time frame and its processing amount are presented in response to a preset operation received before the schedule time frame.

Specifically, the image forming apparatus 12 stores processing completion times of pending jobs, and updates the processing completion times at a timing after job accumulation is completed.

Figure 6:
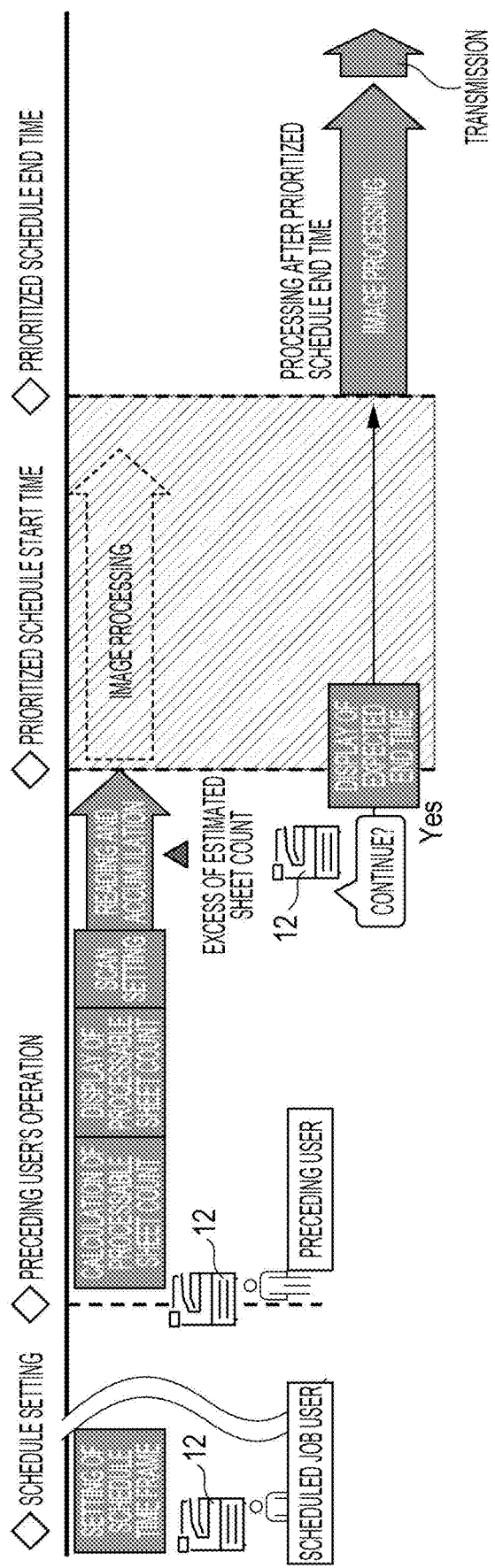
FIG. 6 illustrates operation in a case where another user uses the image forming apparatus according to the exemplary embodiment when a prioritized schedule has been set.

When an operation from another user (preceding user) for selecting a function to be used is detected as an example of the preset operation, as illustrated in FIG. 6, the end time of the pending job and a processable sheet count before the prioritized schedule start time are estimated ("calculation of processable sheet count" in FIG. 6), and the preceding user is notified about the estimated processable sheet count ("display of processable sheet count" in FIG. 6). Other examples of the preset operation include an operation for displaying a function setting screen and an operation for starting the function.

The image forming apparatus 12 starts reading after scan setting is made ("scan setting" and "reading and accumulation" in FIG. 6). If the read sheet count after the start of the job of the preceding user has exceeded the processable sheet count, the preceding user is notified about incompletion of the job before the prioritized schedule start time of the scheduled job user.

The image forming apparatus 12 requests the preceding user to choose whether to execute the job after the prioritized schedule end time or cancel the job. If the preceding user chooses to execute the job after the prioritized schedule end time, the image forming apparatus 12 moves the job of the preceding user to the backend of the pending queue. After all the jobs of the preceding users are accumulated, the preceding users are notified about the expected job end times, and the jobs are executed from the top of the pending queue after the end of the prioritized schedule time frame.

Figure 7:
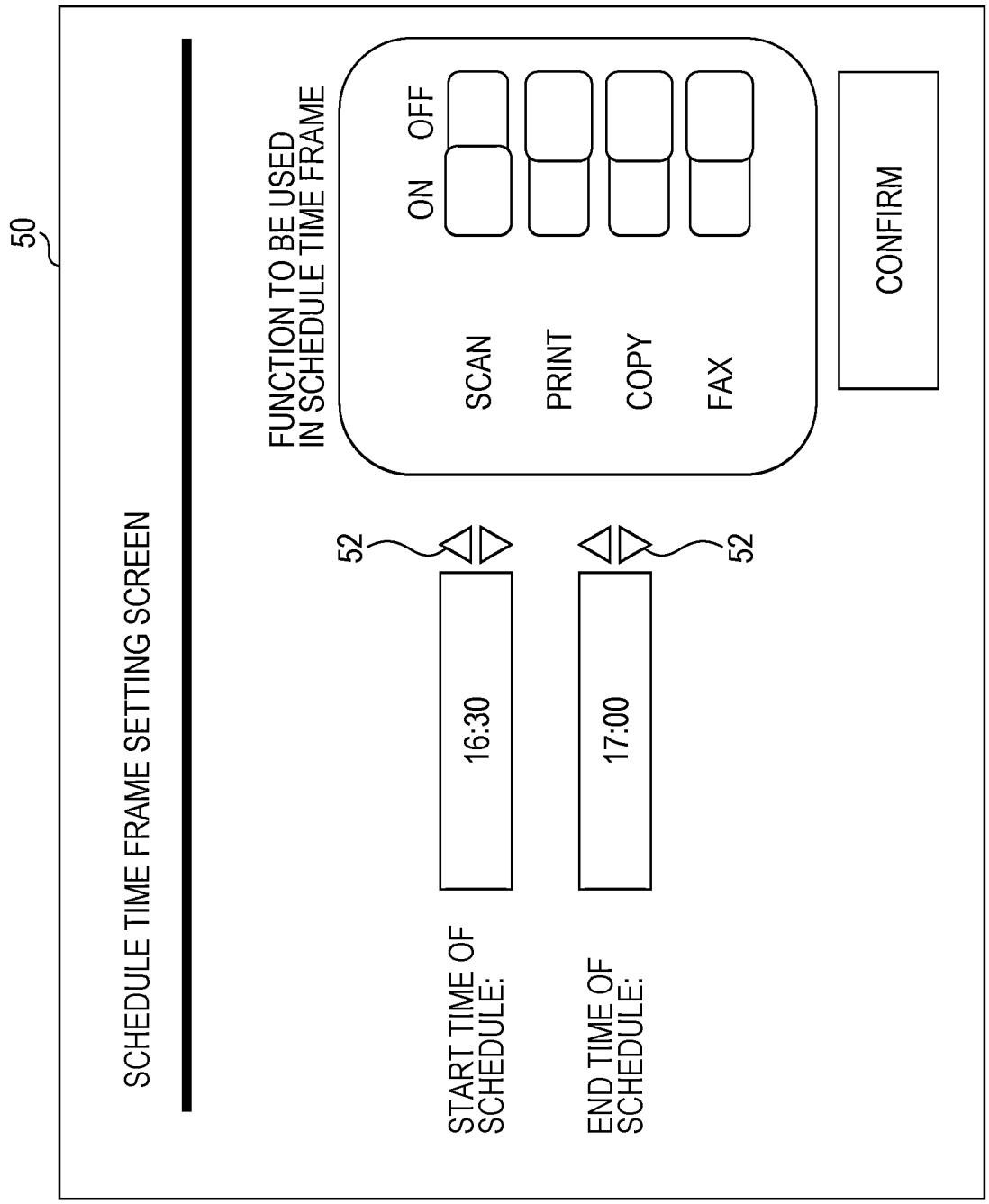
FIG. 7 illustrates an example of a schedule time frame setting screen to be displayed when scheduling the image forming apparatus according to the exemplary embodiment.

FIG. 7 illustrates an example of a schedule time frame setting screen to be displayed when scheduling the image forming apparatus 12 according to this exemplary embodiment.

On a schedule time frame setting screen 50, a schedule start time, a schedule end time, and a function to be used in a schedule time frame are set. The schedule is received in response to an operation on a "confirm" button in FIG. 7. In the example of FIG. 7, times may be set by operating arrow icons 52 or by inputting numerals. In this example, the function to be used in the schedule time frame may be selected by setting ON/OFF for the functions of the image forming apparatus 12 ("scan", "print", "copy", and "fax"). In the example of FIG. 7, the schedule time frame is set by receiving the schedule start time and the schedule end time, but the schedule time frame setting method is not limited to this method. For example, either the schedule start time or the schedule end time, a function, and a processing amount may be received. In this case, one of the schedule start time and the schedule end time, the function, and the processing amount may be used to calculate the other one of the schedule start time and the schedule end time, thereby setting the schedule time frame.

Figure 8:
FIG. 8 illustrates an example of a screen in a case where another user selects scanning by operating a user interface before a prioritized schedule start time.

FIG. 8 illustrates an example of a screen in a case where another user selects scanning by operating the user interface 22 before the prioritized schedule start time.

In response to an operation on the user interface 22 for displaying a scan transmission screen before the prioritized schedule start time, the schedule time frame of the scheduled job user and a processable amount before the schedule time frame are displayed at a lower part of the scan transmission screen as illustrated on the upper side of FIG. 8. In the example of FIG. 8, the schedule time frame of the scheduled job user from the schedule start time to the schedule end time and the processable sheet count before the schedule time frame with current settings are popped up on the scan transmission screen. In the example of FIG. 8, the schedule time frame is 16:00 to 17:00, and the processable sheet count before the schedule time frame is 200 pages.

If the settings are changed, the processable amount before the schedule time frame is recalculated based on the changed settings, and a recalculation result is displayed as illustrated on the lower side of FIG. 8. In the example of FIG. 8, the OCR process is set and the processable page count before the schedule time frame is updated from 200 pages to 50 pages.

If the image processing such as OCR is executed after the scanning, the estimated sheet count may be updated in real time by simply analyzing the accumulated documents (e.g., detecting the number of characters), and the user may be notified in response to detection of an excess of the estimated processable sheet count.

Figure 9:
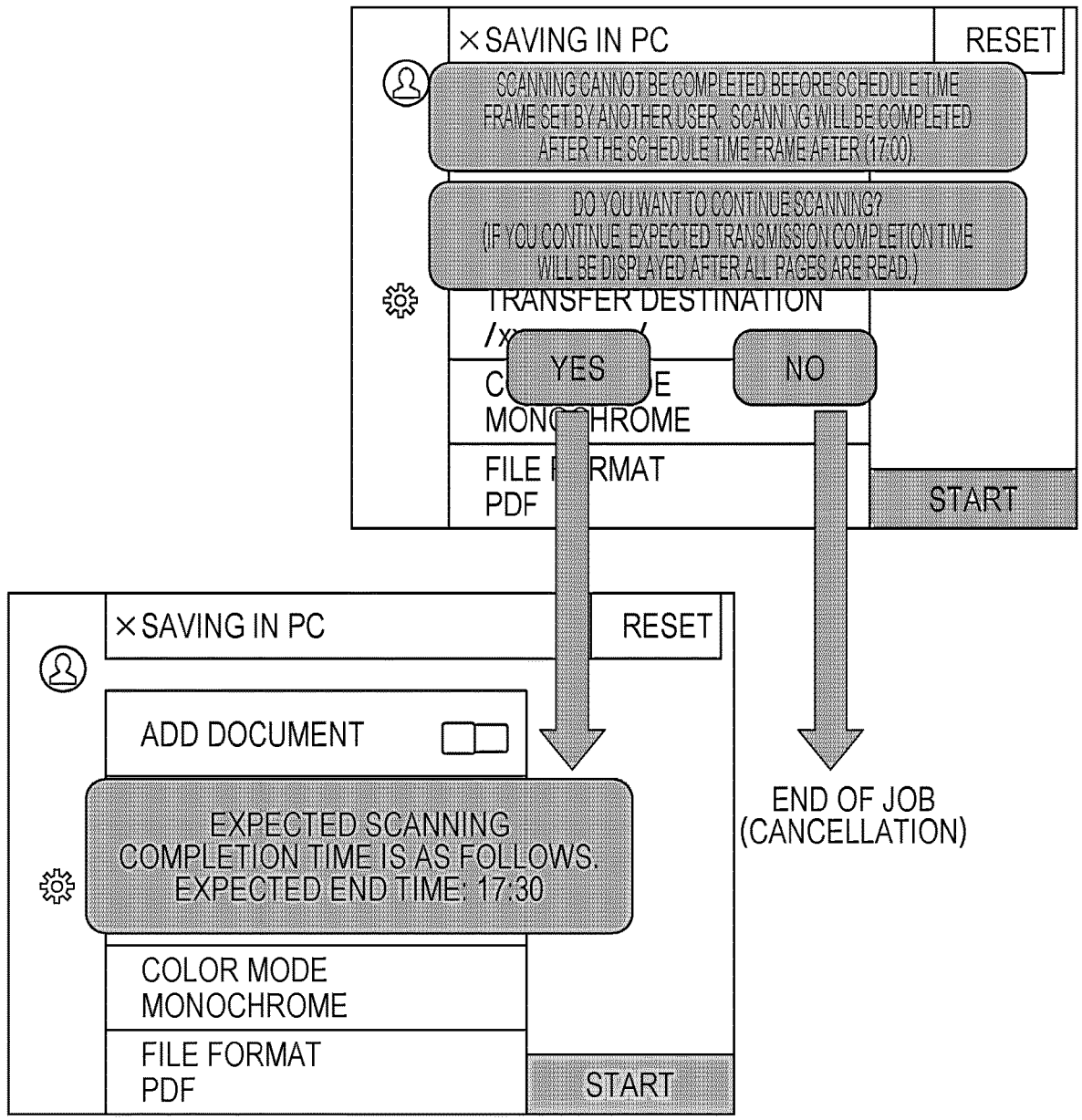
FIG. 9 illustrates a display example of a screen during document reading in a case where an excess of a processable sheet count before a schedule time frame is detected while the other user is accumulating documents before the prioritized schedule start time.

FIG. 9 illustrates a display example of a screen during the document reading in a case where the excess of the processable sheet count before the schedule time frame is detected while the other user is accumulating documents before the prioritized schedule start time.

If the excess of the processable amount before the schedule time frame is detected after the function available before the schedule time frame and its processing amount are displayed and, for example, the scanning is started in response to an execution instruction, a screen for inquiring whether to continue the scanning is displayed. For example, as illustrated on the upper side of FIG. 9, a notification is displayed about incompletion of the scanning before the schedule time frame and about expected completion after the schedule time frame. Further, a message is displayed to prompt the other user to choose whether to continue the process.

If "Yes" is selected in FIG. 9, an expected scanning completion time is calculated and displayed as illustrated on the lower side of FIG. 9. If "No" is selected, the job is canceled and terminated.

For example, the display screen in FIG. 9 is displayed until the other user logs out after completion of accumulation of all pages or until a predetermined period (e.g., 10 seconds) elapses. During the display of the inquiry screen, the document accumulation is continued.

Figure 10:
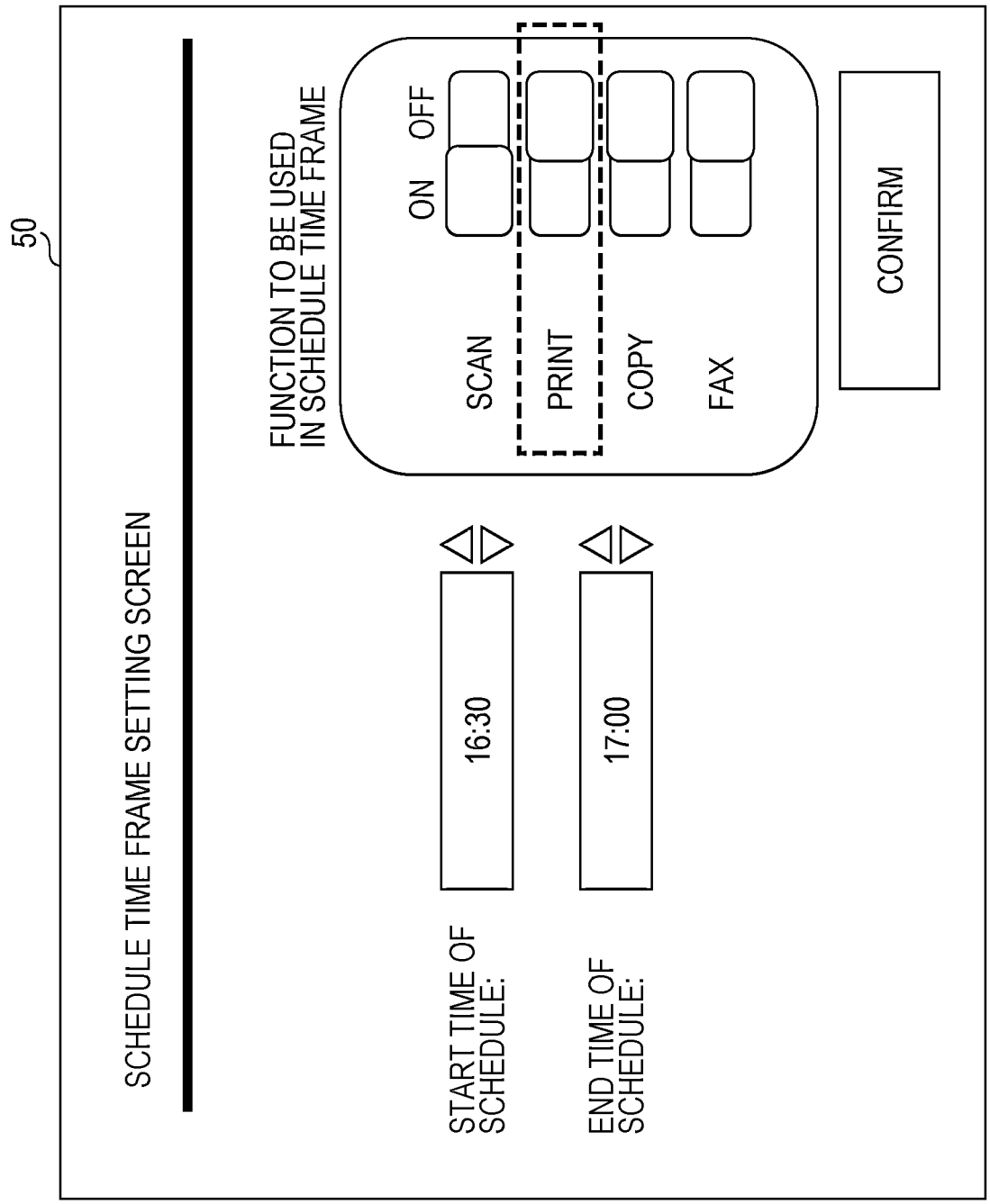
FIG. 10 illustrates an example of the schedule time frame setting screen on which scanning is set as a function to be used in the schedule time frame.
Figure 11:
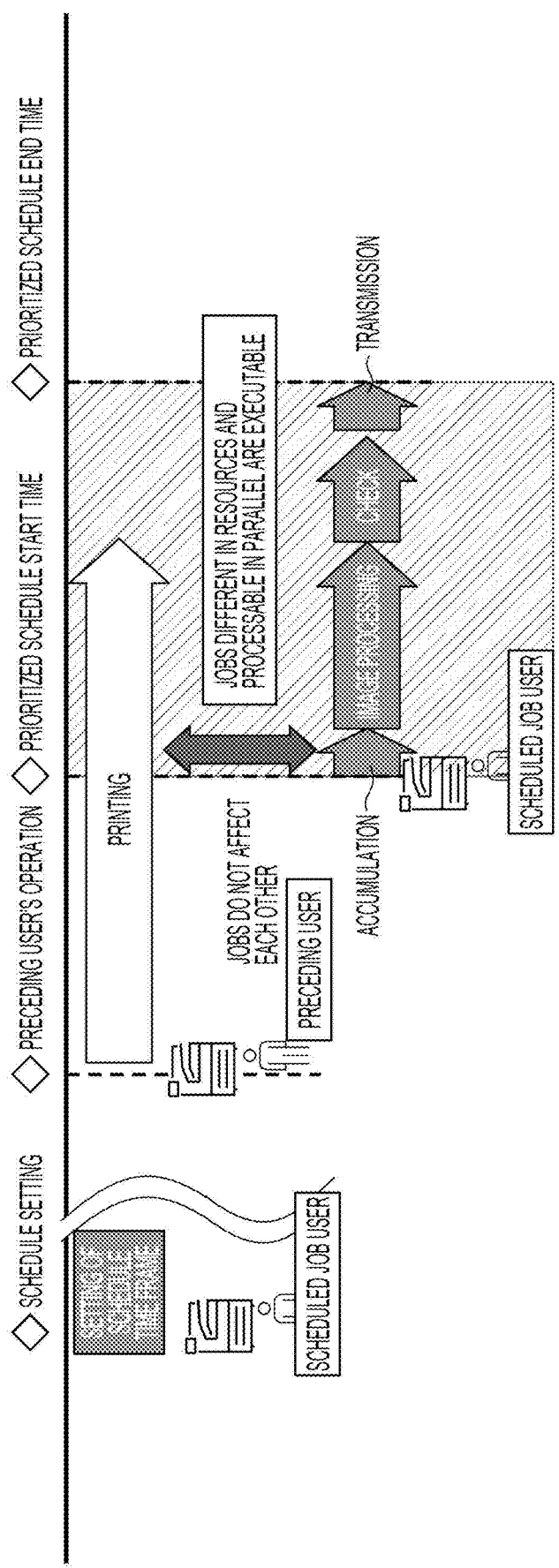
FIG. 11 illustrates an example in which a function executable in parallel to the scheduled function is executed in the schedule time frame.

If the prioritized schedule has been set and the user other than the scheduled job user selects a function that has not been set for use in the prioritized schedule, the job of the scheduled job user and the job of the preceding user have no constraint on the execution. Therefore, the available function and its processing amount are not displayed. For example, in a case where the scanning has been set on the schedule time frame setting screen 50 as the function to be used in the schedule time frame as illustrated in FIG. 10, the printing function indicated by the dotted line in FIG. 10 differs from the scanning in terms of resources and is executable in parallel to the scanning as illustrated in FIG. 11. Therefore, the printing is executed without displaying the processable sheet count or other information.

In response to an elapse of a preset period after the schedule time frame from the schedule start time to the schedule end time and the processable sheet count before the schedule time frame with current settings are displayed on the scan transmission screen, the estimated sheet count may be recalculated and the displayed sheet count may be updated. For example, as illustrated in FIG. 12, a notification about the recalculation of the estimated sheet count is displayed and the recalculated estimated sheet count is displayed after an elapse of one minute.

In a case where the preceding user selects a scan job for reading documents and transmitting data to a preset device, the temporary stop is not made during the transmission to the destination device to keep communication with the destination device. If the job of the preceding user is not completed before the prioritized schedule start time, as illustrated on the upper side of FIG. 13, the documents may be read and accumulated before the schedule time frame, and the communication with the destination device may be established after the prioritized schedule end time and the image processing and the transmission may be executed page by page.

Figure 13:
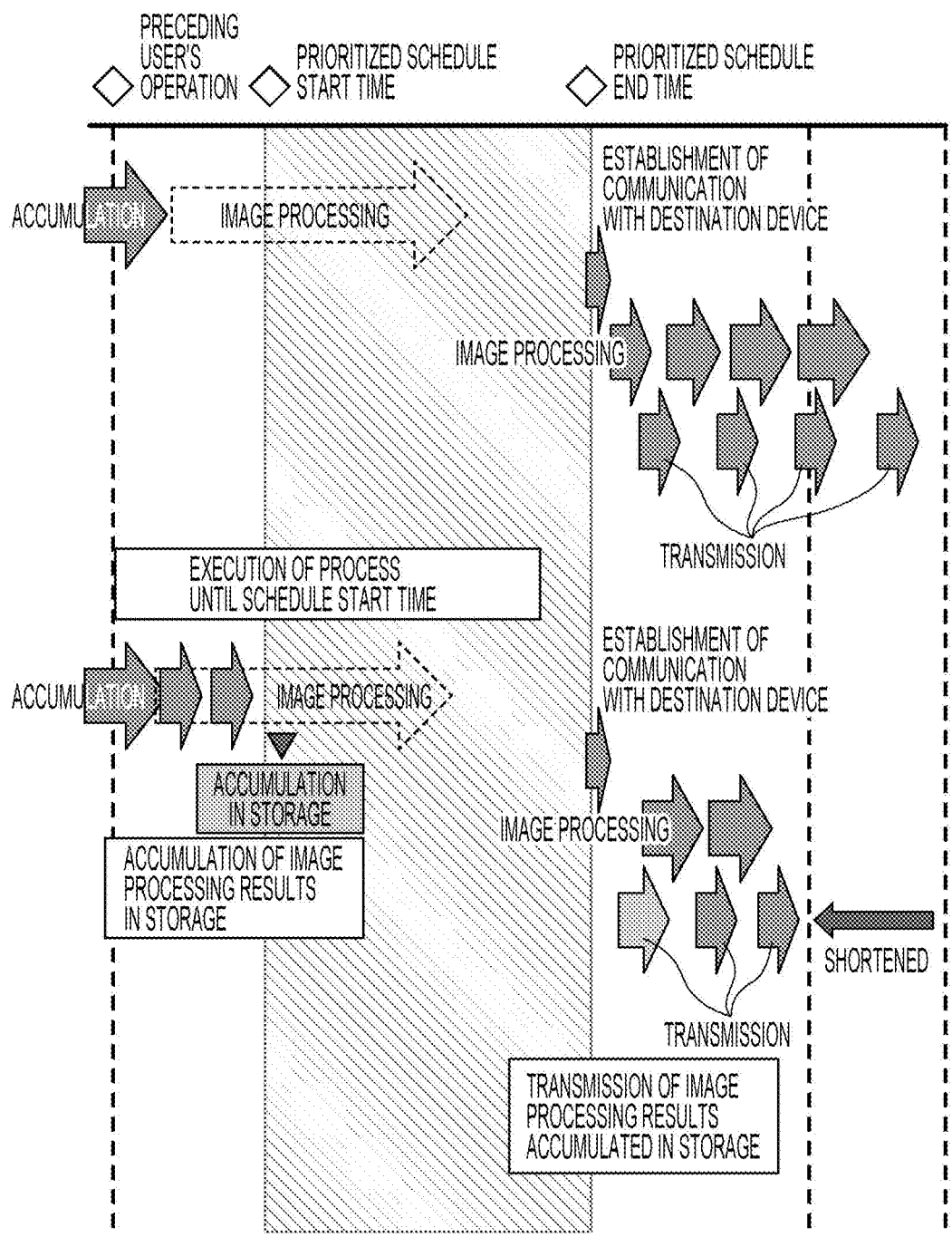
FIG. 13 illustrates an example in which communication with a destination device is established after a prioritized schedule end time and image processing and transmission are executed page by page, and an example in which the image processing is executed and image processing results are accumulated in a storage before the schedule start time and the accumulated image processing results are transmitted after the schedule end time.

In the case where the preceding user selects the scan job, as illustrated on the lower side of FIG. 13, the documents may be read and accumulated before the schedule time frame, the image processing may be executed in a processable amount and processing results may be accumulated in the storage before the schedule time frame, and the remaining image processing and the transmission are executed after the schedule time frame, thereby achieving an earlier processing end time of the preceding user.

Description is made about specific processes to be executed by the image forming apparatus 12 according to this exemplary embodiment having the configuration described above.

Figure 14:
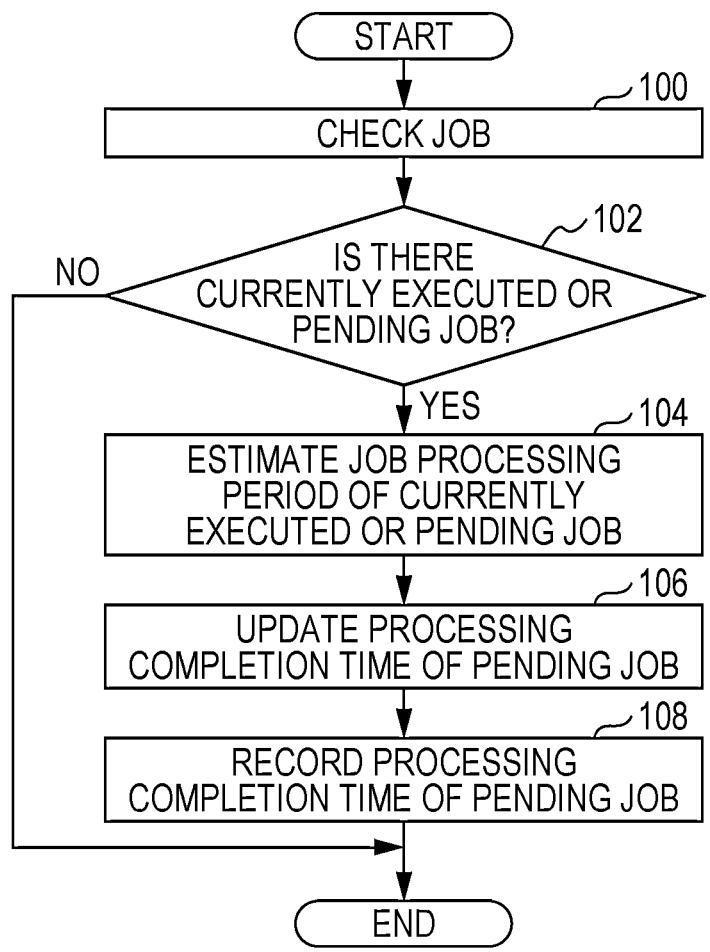
FIG. 14 is a flowchart illustrating an example of a flow of a process to be executed in a case where a schedule time frame has been set in the image forming apparatus according to the exemplary embodiment.

Description is made about a process to be executed by the image forming apparatus 12 in a case where a schedule time frame has been set. FIG. 14 is a flowchart illustrating an example of a flow of the process to be executed in the case where the schedule time frame has been set in the image forming apparatus 12 according to this exemplary embodiment. The process of FIG. 14 is executed in the case where a schedule has been set on the schedule time frame setting screen. For example, the process is executed in response to an elapse of a preset period after each schedule has been set.

In Step 100, the CPU 20A checks a job under instruction, and proceeds to Step 102.

In Step 102, the CPU 20A determines whether there is a currently executed or pending job based on a result of the job check. If the result of the determination is "Yes", the CPU 20A proceeds to Step 104. If the result of the determination is "No", the series of processes is terminated.

In Step 104, the CPU 20A estimates a job processing period of the currently executed or pending job, and proceeds to Step 106.

In Step 106, the CPU 20A updates a processing completion time of the pending job, and proceeds to Step 108.

In Step 108, the CPU 20A records the processing completion time of the pending job, and terminates the series of processes.

Figure 15:
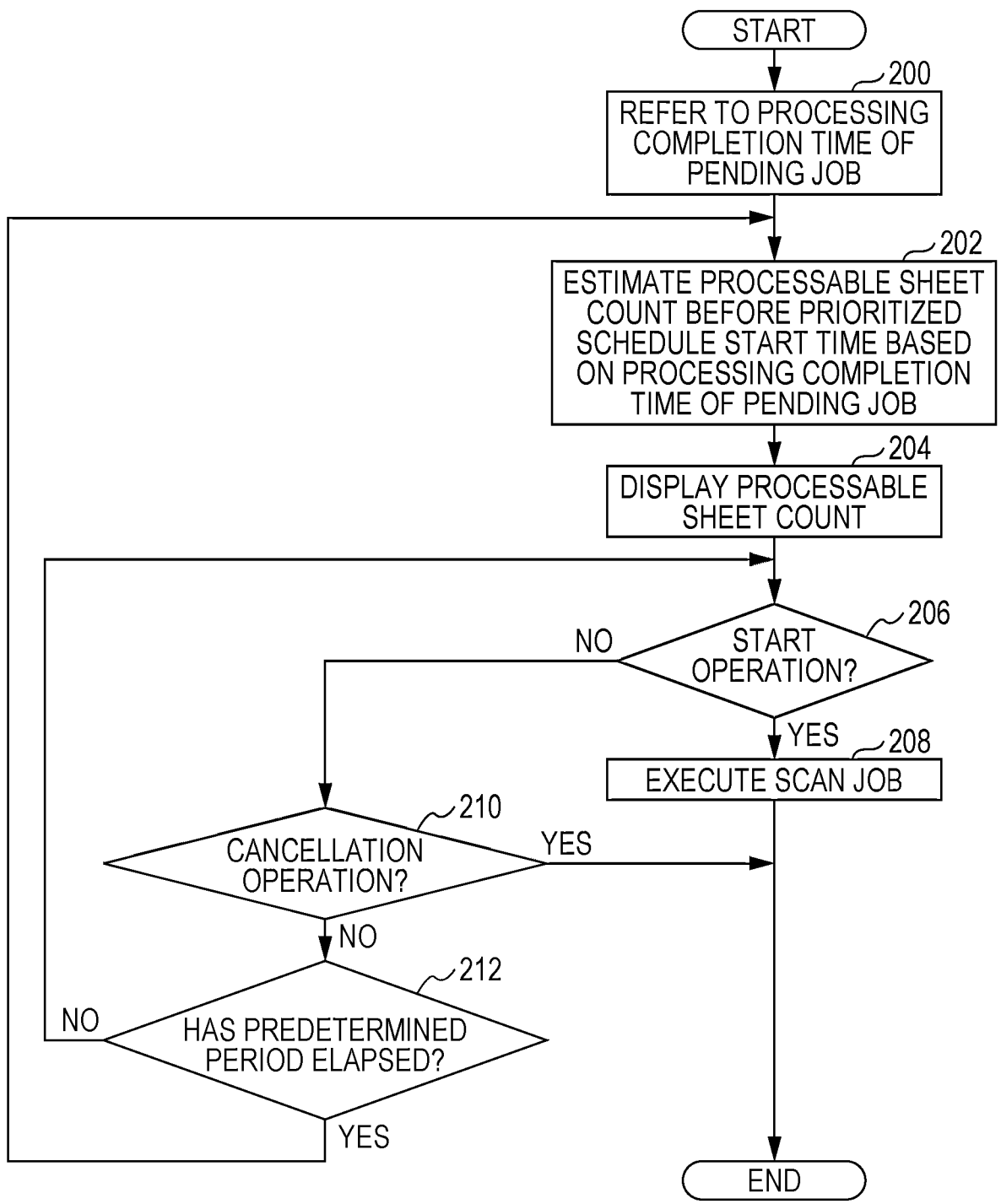
FIG. 15 is a flowchart illustrating an example of a flow of a process to be executed when another user sets a scan job with a prioritized schedule set in the image forming apparatus according to the exemplary embodiment.

Description is made about a process to be executed by the image forming apparatus 12 when another user sets a scan job with a prioritized schedule set. FIG. 15 is a flowchart illustrating an example of a flow of the process to be executed when the other user sets the scan job with the prioritized schedule set in the image forming apparatus 12 according to this exemplary embodiment. The process of FIG. 15 is started, for example, when the other user is detected by card authentication and an instruction is given to display a scan setting screen.

In Step 200, the CPU 20A refers to the processing completion time of the pending job, and proceeds to Step 202. That is, the CPU 20A refers to the processing completion time stored in Step 108.

In Step 202, the CPU 20A estimates a processable sheet count before the prioritized schedule start time based on the processing completion time of the pending job, and proceeds to Step 204.

In Step 204, the CPU 20A displays the processable sheet count on the user interface 22, and proceeds to Step 206.

In Step 206, the CPU 20A determines whether a scanning start operation is made. If the result of the determination is "Yes", the CPU 20A proceeds to Step 208. If the result of the determination is "No", the CPU 20A proceeds to Step 210.

In Step 208, the CPU 20A executes the scan job, and terminates the series of processes. That is, the CPU 20A executes the scan job based on the settings made on the scan setting screen.

In Step 210, the CPU 20A determines whether a cancellation operation is made. If the result of the determination is "Yes", the series of processes is terminated. If the result of the determination is "No", the CPU 20A proceeds to Step 212.

In Step 212, the CPU 20A determines whether a predetermined period has elapsed. If the result of the determination is "Yes", the CPU 20A returns to Step 202 to repeat the processes described above. If the result of the determination is "No", the CPU 20A returns to Step 206 to repeat the processes described above.

Figure 16:
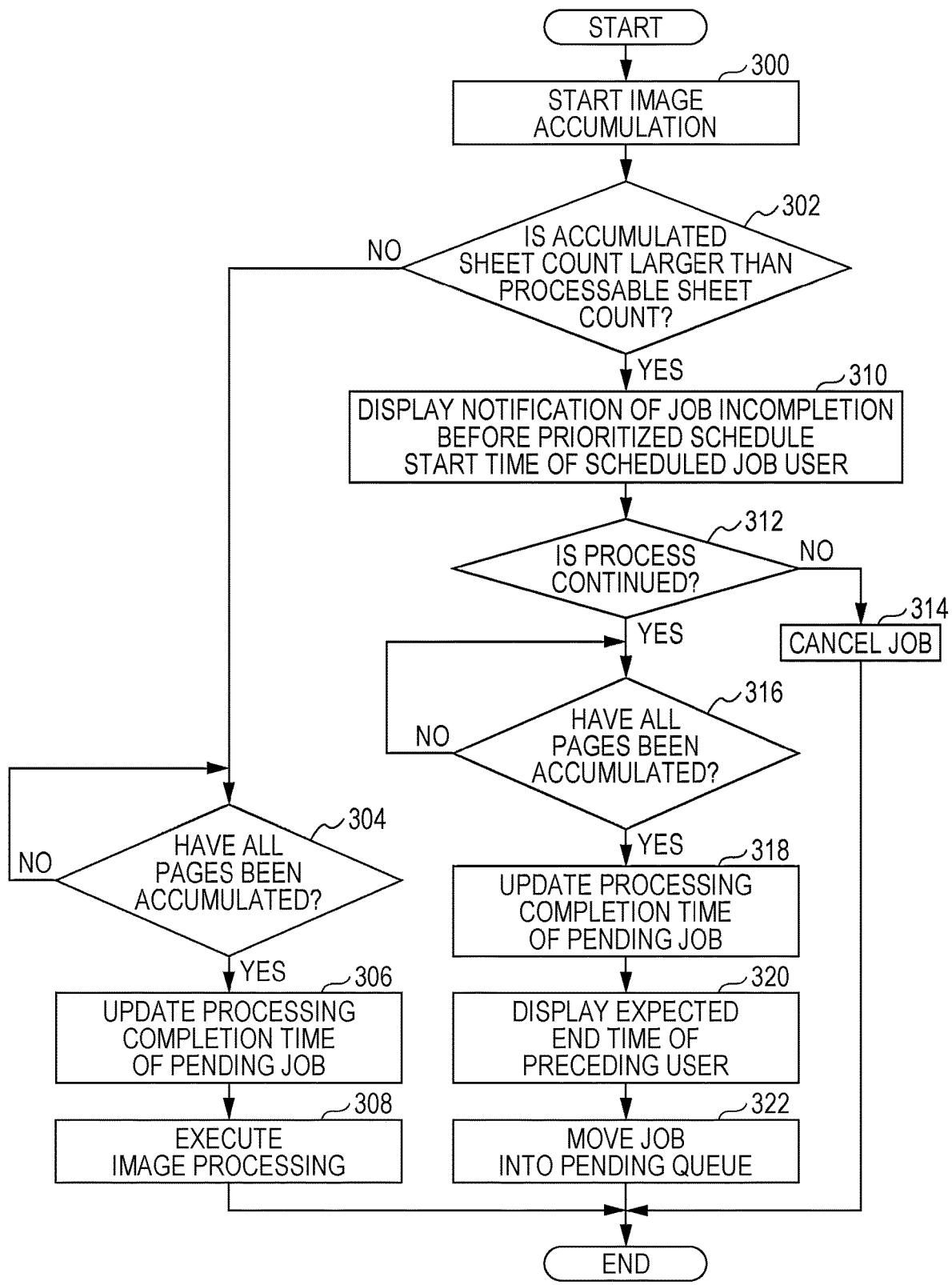
FIG. 16 is a flowchart illustrating an example of a flow of a process to be executed when the other user gives a scanning start instruction with the prioritized schedule set in the image forming apparatus according to the exemplary embodiment.

Description is made about a process to be executed by the image forming apparatus 12 when the other user gives a scanning start instruction with the prioritized schedule set. FIG. 16 is a flowchart illustrating an example of a flow of the process to be executed when the other user gives the scanning start instruction with the prioritized schedule set in the image forming apparatus 12 according to this exemplary embodiment. The process of FIG. 16 is started, for example, when the other user is detected by card authentication and an execution instruction is given on the scan setting screen.

In Step 300, the CPU 20A starts image accumulation, and proceeds to Step 302. That is, the CPU 20A starts document reading and accumulation.

In Step 302, the CPU 20A determines whether the accumulated sheet count is larger than the processable sheet count. If the result of the determination is "No", the CPU 20A proceeds to Step 304. If the result of the determination is "Yes", the CPU 20A proceeds to Step 310.

In Step 304, the CPU 20A determines whether all pages have been accumulated. The CPU 20A waits until the result of the determination becomes "Yes", and then proceeds to Step 306.

In Step 306, the CPU 20A updates the processing completion time of the pending job, and proceeds to Step 308.

In Step 308, the CPU 20A executes the image processing on the accumulated reading results, and terminates the series of processes.

In Step 310, the CPU 20A causes the user interface 22 to display a notification of job incompletion before the prioritized schedule start time of the scheduled job user, and proceeds to Step 312. For example, as illustrated on the upper side of FIG. 9, a notification is displayed about incompletion of the scanning before the schedule time frame and about expected completion after the schedule time frame.

In Step 312, the CPU 20A determines whether the process is continued. In this determination, the CPU 20A determines, for example, whether "Yes" is selected in the screen example illustrated on the upper side of FIG. 9. If "No" is selected, the result of the determination is "No", and the CPU 20A proceeds to Step 314. If the result of the determination is "Yes", the CPU 20A proceeds to Step 316.

In Step 314, the CPU 20A cancels the scan job, and terminates the series of processes.

In Step 316, the CPU 20A determines whether all pages have been accumulated. The CPU 20A waits until the result of the determination becomes "Yes", and then proceeds to Step 318.

In Step 318, the CPU 20A updates the processing completion time of the pending job, and proceeds to Step 320.

In Step 320, the CPU 20A displays an expected end time of the preceding user, and proceeds to Step 322.

In Step 322, the CPU 20A moves the job into the pending queue, and terminates the series of processes.

In the exemplary embodiment described above, the scan transmission is executed, but any other function or workflow in the image forming apparatus 12 may be applied instead of the scan transmission.

In the exemplary embodiment described above, when the operation for selecting the function to be used is received while the schedule has been set, the amount processable by the received function before the schedule time frame is presented. For example, the function available before the schedule time frame and its processing amount may be presented in response to an operation on the user interface 22 or in response to authentication such as login operation. For example, processable amounts may be calculated and presented for the respective functions. In response to selection of any function, the amount processable by the received function before the schedule time frame may be presented.

In the exemplary embodiment described above, when the user other than the user who has set the prioritized schedule uses the image forming apparatus 12, the amount processable by the received function before the schedule time frame is presented. For example, in a case where the schedule has been set, the function available before the schedule time frame and its processing amount may be presented or the amount processable by the received function before the schedule time frame may be presented without recognizing the user.

In the exemplary embodiment described above, the processable amount is presented to the user by causing the user interface 22 to display the processable sheet count before the schedule time frame, but the presentation method for the user is not limited to this method. For example, the processable amount may be presented to the user by voice, by display and voice, by other methods.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The processes to be executed by the image forming apparatus 12 according to the exemplary embodiment described above may be executed by software, by hardware, or by software and hardware in combination. The processes to be executed by the image forming apparatus 12 may be distributed as a program stored in a storage medium.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
a processor configured to:
set a schedule for the image forming apparatus by receiving a schedule time frame; and
present a function available before the schedule time frame and a processing amount of the available function in response to a preset operation received before the schedule time frame.

2. The image forming apparatus according to claim 1, wherein the processor is configured to:
start a process in response to a preset start operation received before the schedule time frame; and
if the process is expected to remain incomplete before the schedule time frame, present an expected processing completion time after the schedule time frame.

3. The image forming apparatus according to claim 2, wherein the processor is configured to:
receive a choice as to whether to continue the process; and
terminate the process if the choice is made not to continue the process.

4. The image forming apparatus according to claim 2, wherein the processor is configured to, in a case of a function executable in parallel in the schedule time frame, execute the function without presenting the processing amount before the schedule time frame.

5. The image forming apparatus according to claim 3, wherein the processor is configured to, in a case of a function executable in parallel in the schedule time frame, execute the function without presenting the processing amount before the schedule time frame.

6. The image forming apparatus according to claim 1, wherein the processor is configured to, in a case of a function executable in parallel in the schedule time frame, execute the function without presenting the processing amount before the schedule time frame.

7. The image forming apparatus according to claim 1, wherein the processor is configured to, if a document reading function is executed before the schedule time frame, present the processing amount processable before the schedule time frame, and then recalculate the processing amount by simply analyzing accumulated documents and present the recalculated processing amount again.

8. The image forming apparatus according to claim 1, wherein the processor is configured to update the processing amount processable before the schedule time frame in response to every elapse of a preset period after the presentation of the processing amount.

9. The image forming apparatus according to claim 1, wherein the processor is configured to, if a process for reading documents and transmitting document reading results to a preset device is executed before the schedule time frame and the process is expected to remain incomplete before the schedule time frame, accumulate the document reading results before the schedule time frame, and execute image processing and transmission in response to establishment of communication after the schedule time frame.

10. The image forming apparatus according to claim 1, wherein the processor is configured to, if a process for reading documents and transmitting document reading results to a preset device is executed before the schedule time frame and the process is expected to remain incomplete before the schedule time frame, accumulate the document reading results before the schedule time frame, execute image processing in an amount processable before the schedule time frame, and execute the remaining image processing and transmission after the schedule time frame.

11. The image forming apparatus according to claim 1, wherein the processor is configured to receive a schedule start time and a schedule end time as the schedule time frame.

12. The image forming apparatus according to claim 1, wherein the processor is configured to receive either a schedule start time or a schedule end time, a function, and a processing amount as the schedule time frame.

13. The image forming apparatus according to claim 12, wherein the processor is configured to use one of the schedule start time and the schedule end time, the function, and the processing amount to calculate the other one of the schedule start time and the schedule end time.

14. An image forming apparatus comprising:
a processor configured to:
set a schedule for the image forming apparatus by receiving a schedule time frame;
receive a selection of a function from a user; and
in response to receiving the selection, present an amount processable by the selected function before the schedule time frame.

15. The image forming apparatus according to claim 14, wherein the processor is configured to:
   start a process in response to a preset start operation received before the schedule time frame; and
   if the process is expected to remain incomplete before the schedule time frame, present an expected processing completion time after the schedule time frame.

16. The image forming apparatus according to claim 15, wherein the processor is configured to:
   receive a choice as to whether to continue the process; and
   terminate the process if the choice is made not to continue the process.

17. The image forming apparatus according to claim 15, wherein the processor is configured to, in a case of a function executable in parallel in the schedule time frame, execute the function without presenting the processing amount before the schedule time frame.

18. The image forming apparatus according to claim 14, wherein the processor is configured to, in a case of a function executable in parallel in the schedule time frame, execute the function without presenting the processing amount before the schedule time frame.

19. A non-transitory computer readable medium storing a program causing a computer to execute a process for image forming, the process comprising:
   setting a schedule for an image forming apparatus by receiving a schedule time frame; and
   presenting a function available before the schedule time frame and a processing amount of the available function in response to a preset operation received before the schedule time frame.

* * * * *